Sept. 25, 1962   J. F. VAUGHEN   3,055,446
AIR-SUPPORTED CARGO PLATFORM OR CONTAINER
Filed Dec. 28, 1959

INVENTOR.
Jack F. Vaughen
BY

United States Patent Office 3,055,446
Patented Sept. 25, 1962

3,055,446
AIR-SUPPORTED CARGO PLATFORM OR CONTAINER
Jack F. Vaughen, Irving, Tex.
(26807 Spring Creek Road, Palos Verdes Peninsula, Calif.)
Filed Dec. 28, 1959, Ser. No. 862,424
3 Claims. (Cl. 180—7)

In the field of freight transportation the practice of "containerization" and "palletizing" has become widespread. Special ships, trucks, and railroad cars are now used to transport fully loaded containers and pallets which are never opened for repacking during transit. Since these loaded containers and pallets may have weights up to 35,000 pounds each, they have created special handling problems. As a result of their great weight, they have a great deal of friction which resists their translational movement across the surface on which they rest. Therefore, heavy duty lift trucks or cranes are required to move them about the floor of a warehouse or the deck of a ship or to transfer them from one means of conveyance to another. Since these lift trucks or cranes are expensive and complex, however, it is currently economically feasible to use standard highway semi-truck trailers as cargo containers. These semi-truck trailers are loaded via special ramps onto railroad flatcars or ships for transport. Although this practice of "piggyback" or "fishyback" operation has become very widespread and is growing rapidly, it is still relatively expensive. Approximately 60% of the cost of the semi-truck trailer is represented by its undercarriage and wheeled running gear. In "piggyback" or "fishyback" operations, however, this running gear is only used during loading and unloading the semi-truck trailer onto flatcar or ship. During actual transit, this expensive running gear is unused and represents an added dead weight which must be carried. Therefore, it is apparent that a great need exists for a low cost means of transferring loaded containers or pallets from one means of conveyance to another without requiring expensive running gear to be carried along with the container or pallet during transit. It is the primary object of my invention to provide such a low cost means of transferring loaded cargo containers or pallets from one means of conveyance to another. This invention can also be used to move a loaded container or pallet about the floor of a warehouse or the deck of a ship.

It is an object of this invention to create and efficiently seal a number of separate cushions of air between the bottom of a heavy cargo platform or container and the surface on which it normally rests to eliminate the friction which would normally be present between the bottom of the platform or container and the surface on which it rests.

Figure 1:
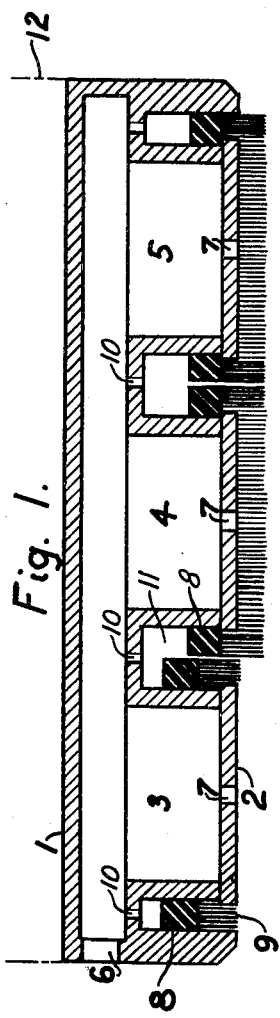
Figure 2:
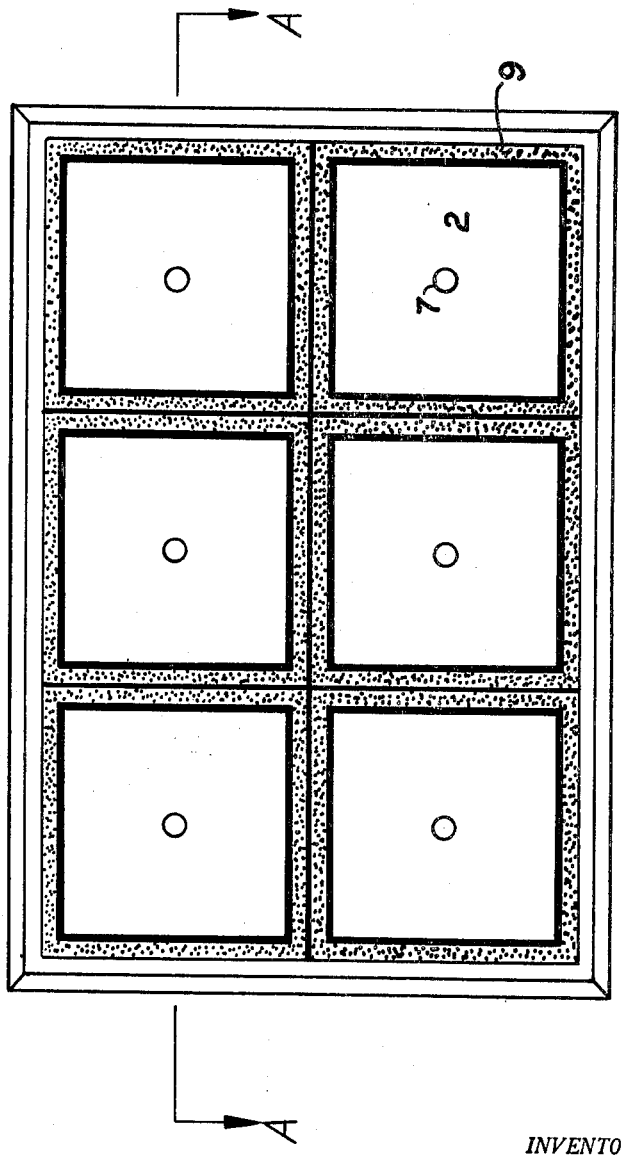

For a better understanding of this invention reference may be made to the drawings of which FIGURE 1 is a cross-sectional profile view of the bottom portion of the cargo container or platform taken on the line A—A of FIGURE 2, and FIGURE 2 is a bottom plan view of the cargo container or platform.

The upper floor 1 forms the inside floor of a container or the top surface of a cargo platform or pallet. In the lower floor 2 of the pallet or container there are an arbitrary number of box-like cavities, 3, 4, 5, etc. which open upward into the space between the two floors or bottoms as shown in FIGURE 1. The space enclosed between the bottom floor 2 and upper floor 1 is air tight except for special openings as will be described. Opening 6 is provided for attaching an external air hose to introduce relatively high pressure air into the air tight space between the two floors 1 and 2. This high pressure air can flow to the outside atmosphere only through the small holes 7 which are drilled through the bottom surfaces of each air cavity 3, 4, 5, etc.

A close fitting collar 8 is fitted around the outside of each box-like cavity 3, 4, 5, etc., and is free to slide up and down on the outside wall of the cavity to which it is fitted. Each collar 8 has a large number of stiff brush-like bristles 9 which extend completely around its lower edge. A number of small air holes 10 are provided to allow the relatively high pressure air to flow from the space between the two floors into the chambers 11 which hold the collars 8.

The method of operation of this device is as follows: When the cargo container 12 or pallet is to be moved an air hose is attached to the opening 6 and high pressure air is introduced into the cavity between the upper floor 1 and lower floor 2. This high pressure air will force its way downward through the holes 7 in the bottoms of the air cavities 3, 4, 5, etc., and will flow outward from each hole producing a thin cushion of relatively high pressure air between the bottom floor 2 and the surface on which the container or pallet is resting. This will cause the container or pallet to rise off the surface a small distance. The high pressure air could then escape around the periphery of the container or pallet except for the action of the collars 8 and their brush-like bristles 9. These bristles rest on the surface even though the pallet or container rises off the surface. They (the bristles) are pressed onto the surface by the relatively high pressure air in their chambers 11. Since a wall of bristles 9 surrounds each cavity 3, 4, 5, etc., the bristles trap the high pressure air under the cavity so it cannot flow outward away from the periphery of the container or pallet. Thus, a high pressure cushion of air is trapped under each cavity 3, 4, 5, etc., causing the container or pallet to rise a small distance off the surface and eliminating the friction between the bottom of the container or pallet 2 and the surface on which it normally rests. The container or pallet can then be moved horizontally in any direction with a relatively small effort since the only parts which contact the surface and produce friction are the bristles 9. These bristles are sufficiently flexible to follow any reasonably small surface deformity over which the pallet or container may be pushed and provide a continuous seal around the high pressure air cushion which exists under each of the cavities 3, 4, 5.

This sealing action will remain effective to maintain a sufficient number of air cushions under the pallet or container even though the container is moved across a gap or over a small step or curbing in the surface on which it rests. In FIGURE 1 the sliding collar 8 which surrounds air cavity 3 is shown in its fully retracted position. This is the position collar 8 would normally occupy when the pallet or container is resting on a surface with no relatively high pressure air being supplied through the opening 6 into the space between bottoms 1 and 2. With collar 8 in this retracted position, when high pressure air is introduced through opening 6, it can flow readily through holes 7 to form a high pressure air cushion under the bottom 2. This air cushion is surrounded by bristles 9, and therefore causes the lower floor 2 to rise off the supporting surface while the bristles 9 remain in contact with the supporting surface.

I claim:
1. A container or cargo platform which has a double bottom, the lower bottom having a number of box-like cavities which open upward into the space between the two floors or bottoms, each cavity having an arbitrary number of small holes drilled through its bottom surface, means being provided to introduce relatively high pressure air into the closed space between the two floors or bottoms.

2. A cargo container or pallet as described in claim 1, each boxlike cavity in the lower bottom being surrounded by a close fitting collar which is free to slide up and down on the outside vertical surface of the cavity, this collar being fitted around its entire lower periphery with brush-like bristles.

3. A cargo pallet or container which has a double bottom forming an air chamber, the lower bottom having a number of upward opening boxlike cavities each surrounded by a sliding collar which is fitted around its entire lower periphery with brushlike bristles; an arbitrary number of holes being drilled through the bottom of each boxlike cavity to allow relatively high pressure air to flow from the inside of the boxlike cavity to the space under the boxlike cavity which is surrounded by the sliding brush seal, thus causing a cushion of high pressure air to be trapped under each boxlike cavity thereby eliminating friction between the bottom of the container or pallet and the surface on which it normally rests.

References Cited in the file of this patent

UNITED STATES PATENTS

| | | |
|---|---|---|
| 936,395 | Worthington | Oct. 12, 1909 |
| 2,743,787 | Seck | May 1, 1956 |
| 2,918,183 | Petersen et al. | Dec. 22, 1959 |
| 2,938,590 | Barnett | May 31, 1960 |

FOREIGN PATENTS

| | | |
|---|---|---|
| 379,020 | France | June 20, 1907 |